United States Patent
Mochizuki et al.

(10) Patent No.: US 8,139,192 B2
(45) Date of Patent: Mar. 20, 2012

(54) LIQUID CRYSTAL DISPLAY DEVICE

(75) Inventors: Yuuki Mochizuki, Osaka (JP); Masaharu Akitomo, Osaka (JP); Dai Chiba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 163 days.

(21) Appl. No.: 12/669,873

(22) PCT Filed: Jun. 26, 2008

(86) PCT No.: PCT/JP2008/001671
§ 371 (c)(1),
(2), (4) Date: Apr. 15, 2010

(87) PCT Pub. No.: WO2009/013855
PCT Pub. Date: Jan. 29, 2009

(65) Prior Publication Data
US 2010/0253896 A1    Oct. 7, 2010

(30) Foreign Application Priority Data
Jul. 20, 2007   (JP) ................................ 2007-189897

(51) Int. Cl.
*G02F 1/1343* (2006.01)
(52) U.S. Cl. ............ 349/139; 349/56; 349/84; 349/140; 349/141
(58) Field of Classification Search .................... 349/56, 349/84, 139, 140, 141
See application file for complete search history.

(56) References Cited

U.S. PATENT DOCUMENTS

| | | | |
|---|---|---|---|
| 6,710,825 B2 | 3/2004 | Kubo et al. | |
| 6,724,452 B1 | 4/2004 | Takeda et al. | |
| 7,738,060 B2 * | 6/2010 | Tanaka et al. | 349/110 |
| 7,940,359 B2 * | 5/2011 | Lee | 349/138 |
| 2002/0036744 A1 | 3/2002 | Kubo et al. | |
| 2005/0237461 A1 * | 10/2005 | Choi et al. | 349/129 |
| 2007/0165172 A1 | 7/2007 | Takatori et al. | |

FOREIGN PATENT DOCUMENTS

| | | |
|---|---|---|
| JP | 2004-205902 | 7/2004 |
| JP | 2005-227482 | 8/2005 |
| JP | 2006-98706 | 4/2006 |

OTHER PUBLICATIONS

International Preliminary Report on Patentability mailed Feb. 18, 2010 in corresponding PCT Application No. PCT/JP2008/001671.
International Search Report for PCT/JP2008/001671, mailed Aug. 12, 2008.

* cited by examiner

*Primary Examiner* — Jennifer Doan
(74) *Attorney, Agent, or Firm* — Nixon & Vanderhye, P.C.

(57) ABSTRACT

A liquid crystal display device is provided with high fabrication efficiency, which produces small display unevenness and which is capable of high quality display with excellent viewing angle characteristics and high transmittance.

A liquid crystal display device of the present invention includes: a first substrate which includes pixel electrodes and an alignment film; a second substrate which includes a common electrode; and a liquid crystal layer interposed between the first substrate and the second substrate. Each of the pixel electrodes includes a plurality of subpixel electrodes electrically separated from one another on an insulating layer. The subpixel electrodes have a recess recessed toward the insulating layer. The subpixel electrodes and a drain line are connected at the recess. Part of the common electrode lying above a whole area of the pixel electrodes is substantially flat.

8 Claims, 4 Drawing Sheets

LIQUID CRYSTAL DISPLAY DEVICE

This application is the U.S. national phase of International Application No. PCT/JP2008/001671 filed 26 Jun. 2008, which designated the U.S. and claims priority to JP Application No. 2007-189897 filed 20 July 2007, the entire contents of each of which are hereby incorporated by reference.

TECHNICAL FIELD

The present invention relates to a liquid crystal display device and a method for fabricating a liquid crystal display device.

BACKGROUND ART

Liquid crystal display devices (LCD) are now in wide use as display devices for mobile phones, television sets, computers, etc. Conventional horizontal alignment type liquid crystal display devices which are prevalent today include TN (Twisted Nematic) mode and STN (Super Twisted Nematic) mode liquid crystal display devices in which a nematic liquid crystal material of positive dielectric constant anisotropy is used.

In recent years, with the view of improving the viewing angle characteristics and the display contrast, VAN (Vertical Aligned Nematic) mode vertical alignment type liquid crystal display devices have been developed and become increasingly prevalent.

FIG. 5 shows the structure of a pixel portion of a vertical alignment type liquid crystal display device described in Patent Document 1. This conventional liquid crystal display device is a transmission type liquid crystal display device which includes liquid crystal molecules 100 of negative dielectric constant anisotropy encapsulated between a TFT substrate and a counter substrate. The TFT substrate includes a substrate 110, a transparent electrode 111, an insulating layer 112 of silicon nitride or the like, a pixel electrode 114, a vertical alignment film 115, etc. The counter electrode includes a glass substrate 101, a common electrode 102 of ITO or the like, a vertical alignment film 103, etc. The transparent electrode 111 is connected to the pixel electrode 114 via a through hole 113 formed in the insulating layer 112. Provided around the pixel electrode 114 is a shield electrode 116.

When no voltage is applied between the common electrode 102 and the pixel electrode 114, the liquid crystal molecules 100 are aligned substantially vertically to the substrates because of the vertical alignment films 103 and 115. When a voltage is applied between the common electrode 102 and the pixel electrode 114, an electric field is produced which extends from the perimeter of the pixel electrode 114 toward a position right above the center of the pixel electrode 114. The liquid crystal molecules 100 are oriented along this electric field in such a manner that they lean toward the center of the pixel as shown in the drawing.

FIG. 6 shows an example of the shape of the pixel electrode 114. As shown in the drawing, the pixel electrode 114 has indentations recessed toward the inner area of the electrode. Three generally-quadrate parts of the pixel electrode 114 which are defined by the indentations are herein referred to as "subpixel electrodes 120". Parts of the pixel electrode 114 which are defined by the indentations and which have a narrower width than the subpixel electrodes 120 are herein referred to as "bridge portions 121".

Thus, the pixel electrode 114 has such a structure that the three subpixel electrodes 120 are connected together by the two bridge portions 121. The subpixel electrodes 120 and the bridge portions 121 are simultaneously formed of the same material in the same layer as an integral piece of pixel electrode.

Patent Document 2 describes a liquid crystal display device wherein each pixel includes a pixel electrode which has a slope surface configured for alignment control. The common electrode of this liquid crystal display device has slits at positions right above the pixel electrodes.

[Patent Document 1] Japanese Laid-Open Patent Publication No. 2001-264784
[Patent Document 2] Japanese Laid-Open Patent Publication No. 2004-205902

DISCLOSURE OF INVENTION

Problems to be Solved by the Invention

In the liquid crystal display device of Patent Document 1, disturbance occurs in the liquid crystal alignment at the boundaries between the subpixel electrodes 120 and the bridge portions 121 of the pixel electrode 114.

FIG. 7 shows disturbance in the liquid crystal alignment which is caused because of the pixel electrode 114. For improving the viewing angle characteristics of the liquid crystal display device, it is desirable that the liquid crystal residing above the subpixel electrode 120 is aligned uniformly in directions perpendicular to the sides of the subpixel electrode 120, from the perimeter of the subpixel electrode 120 toward a position right above the center of the subpixel electrode 120.

However, in the liquid crystal display device of Patent Document 1, as shown in FIG. 7, a region near the boundary between the subpixel electrode 120 and the bridge portion 121 (a region encircled by a phantom line) includes liquid crystal molecules 125 which are aligned in different directions, resulting in nonuniform alignment of the liquid crystal, i.e., a so-called "alignment disturbance" problem. Furthermore, nonuniform widths of the bridge portions 121 which are generated in the fabrication process of the pixel electrode 114 cause alignment disturbance and variations in the liquid crystal near the bridge portions, resulting in occurrence of display unevenness.

In the liquid crystal display device of Patent Document 2, a pixel electrode provided in each pixel has a slope surface for alignment control. Patent Document 2 describes that, in this liquid crystal display device, the pixel electrode covers the whole pixel area, and therefore, the slope surface produces only a small alignment controlling force so that the alignment control is not sufficiently achieved, and that it is hence necessary to provide a slit (opening) or protrusion in the common electrode at a position right above the slope surface. Thus, in the liquid crystal display device of Patent Document 2, formation of slits or protrusions in the common electrode is indispensable.

However, in a liquid crystal display device which has such slits or protrusions, an additional step is necessary for the formation of slits or protrusions in the common electrode, and therefore, the fabrication efficiency deteriorates. In the case of forming an alignment film over the common electrode by application of polyimide or the like, washing steps are carried out before and after the application. The slits or protrusions, if present, would be stained with the alignment film material or the like, and the stain would cause an alignment disturbance problem in the liquid crystal molecules. Occurrence of alignment disturbance leads to leakage of light during black display, causing display unevenness and degradation of the contrast.

The present invention was conceived in view of above circumstances. One of the objects of the present invention is to provide a liquid crystal display device which produces small display unevenness and has excellent viewing angle characteristics and high transmittance and which is capable of high quality display, with high fabrication efficiency.

Means for Solving the Problems

A display device of the present invention is a liquid crystal display device having a plurality of pixels, including: a first substrate which includes an insulating layer, pixel electrodes disposed on the insulating layer respectively in the plurality of pixels, and an alignment film disposed on the pixel electrodes for vertically aligning liquid crystal molecules in the absence of an applied voltage; a second substrate which has a common electrode; and a liquid crystal layer interposed between the first substrate and the second substrate, wherein each of the pixel electrodes includes a plurality of subpixel electrodes electrically separated from one another on the insulating layer, each of the plurality of subpixel electrodes has a recess recessed toward the insulating layer, the first substrate includes a connecting portion which is provided under the insulating layer and which is electrically connected to respective one of the plurality of subpixel electrodes at the recess, and part of the common electrode lying above a whole area of the pixel electrodes is substantially flat.

In one embodiment, part of an interface between the liquid crystal layer and the second substrate lying above the whole area of the pixel electrodes is substantially flat.

In one embodiment, the second substrate includes a second alignment film which is disposed on a surface of the common electrode closer to the liquid crystal layer and which is configured to vertically align the liquid crystal molecules in the absence of an applied voltage, and part of the second alignment film lying above a whole area of respective one of the plurality of subpixel electrodes is substantially flat.

In one embodiment, the liquid crystal display device further includes TFTs respectively provided in the plurality of pixels. Each of the plurality of pixel electrodes and each of drain electrodes of the TFTs are electrically coupled via the connecting portion.

In one embodiment, the recess is provided at a center of each of the plurality of subpixel electrodes.

In one embodiment, the recess has a generally-circular shape when seen in a direction perpendicular to a surface of the first substrate.

In one embodiment, a diameter of the recess is not less than 5 μm and not more than 25 μm when seen in a direction perpendicular to the surface of the first substrate.

In one embodiment, a depth of the recess is not less than 1 μm and not more than 5 μm.

EFFECTS OF THE INVENTION

According to the present invention, a pixel electrode is formed by a plurality of subpixel electrodes which are electrically separated from one another on a substrate. Therefore, it is not necessary to form a bridge portion on the substrate for connection of the subpixel electrodes. Thus, alignment disturbance in the liquid crystal molecules which would be caused by the presence of a bridge portion is prevented. The display can be performed with uniform viewing angle characteristics in all the azimuthal directions and with high response rate.

Since the alignment of the liquid crystal molecules is controlled by the recesses of the respective subpixel electrodes, the display can be performed with improved viewing angle characteristics and higher response rate.

Since none of the common electrode and the alignment film of the counter substrate has hollows, slits, protrusions, or the like, and the interface between the counter substrate and the liquid crystal layer is flat, alignment disturbance which would be caused by irregularities on the counter substrate does not occur, and light is not excessively shielded in the pixel. Therefore, display with high brightness and small display unevenness is possible. The step of forming hollows, slits, protrusions, or the like, is unnecessary, so that the fabrication efficiency of the device can be improved.

Since alignment control means is not provided on the counter substrate side but on the TFT substrate side, the position of the alignment center and the boundaries of the alignment of the liquid crystal molecules can readily be determined on the TFT substrate side. Misregistration of the alignment center which would be caused by misregistration in assemblage of the TFT substrate and the counter substrate does not occur. Therefore, alignment control can be achieved more precisely, and occurrence of display unevenness and degradation of the viewing angle characteristics can be prevented.

Since the liquid crystal alignment is controlled according to the shape of the subpixel electrodes, the device fabrication process does not need to include a rubbing process for defining the azimuthal directions of the liquid crystal alignment. Thus, the device fabrication efficiency can be improved.

Since the subpixel electrode and the connecting portion are connected at the recess which functions as the alignment control means, it is not necessary to provide an additional contact hole for supply of a voltage to the subpixel electrode. Therefore, the fabrication efficiency of the liquid crystal display device further improves.

Thus, the present invention enables provision of a liquid crystal display device which has excellent viewing angle characteristics and contrast and which is capable of high quality display with small display unevenness, with high fabrication efficiency.

Figure 1:
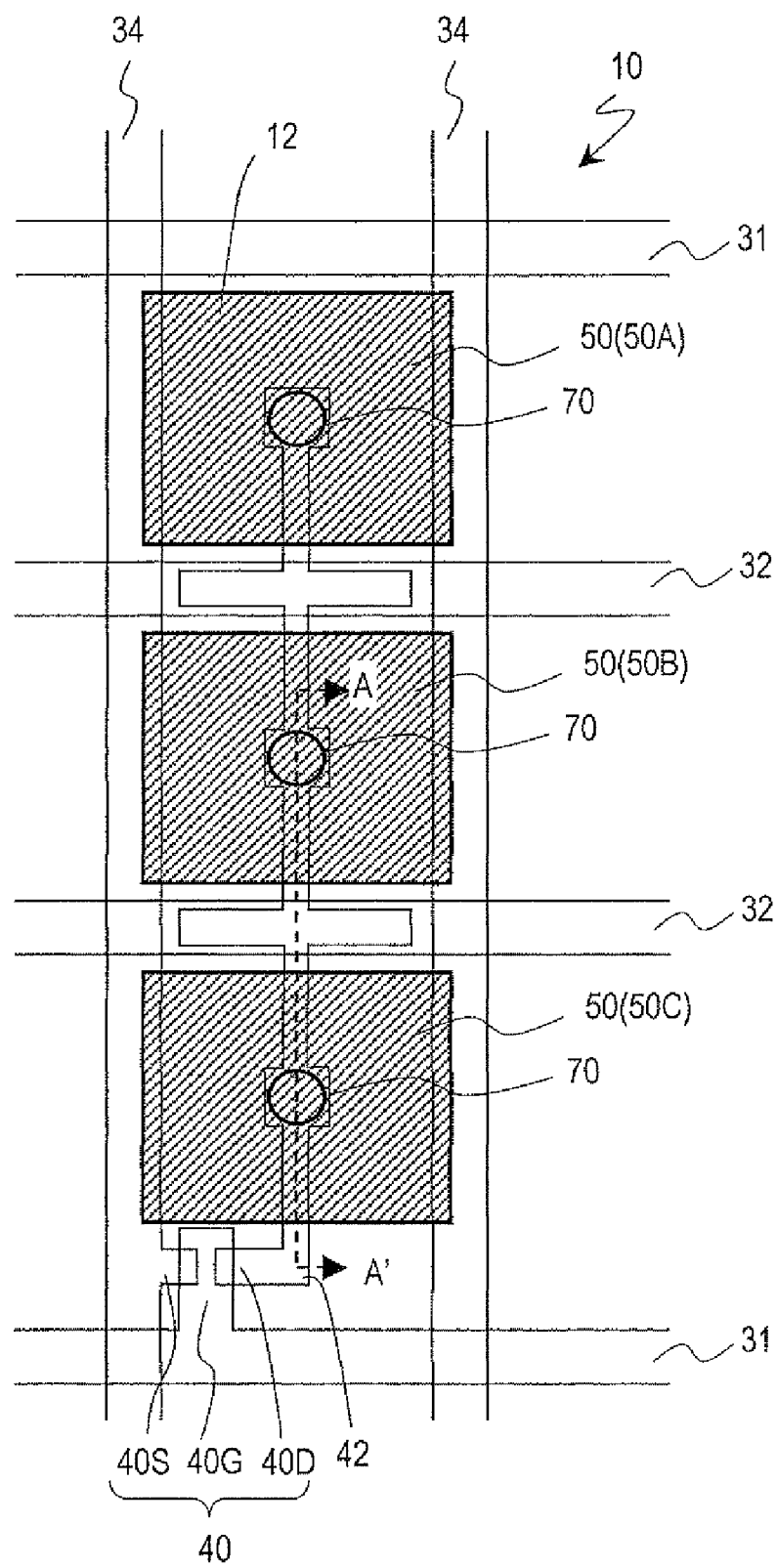
FIG. 1 Plan view of a liquid crystal display device 10 of an embodiment of the present invention, schematically showing the structure of one pixel 12.

DESCRIPTION OF THE REFERENCE NUMERALS 10 liquid crystal display device
12 pixel

20 LET substrate
21 counter substrate
22 liquid crystal layer
30 glass substrate
31 gate bus line
32 auxiliary capacitance line
33 gate insulating layer
34 source bus line
35 insulating layer
37 alignment film
40 TFT
40G gate electrode
40S source electrode
40D drain electrode
42 drain line
50 pixel electrode
50A, 50B, 50C subpixel electrode
61 glass substrate
62 color filter layer
63 common electrode
64 alignment film
70 recess
71 liquid crystal molecules
100 liquid crystal molecules
101 glass substrate
102 common electrode
103 vertical alignment film
110 substrate
111 transparent electrode
112 insulating layer
113 through hole
114 pixel electrode
115 vertical alignment film
116 shield electrode
120 subpixel electrode
121 bridge portion
125 liquid crystal molecules

BEST MODE FOR CARRYING OUT THE INVENTION

Hereinafter, an embodiment of a liquid crystal display device of the present invention is described with reference to the drawings.

Figure 2:
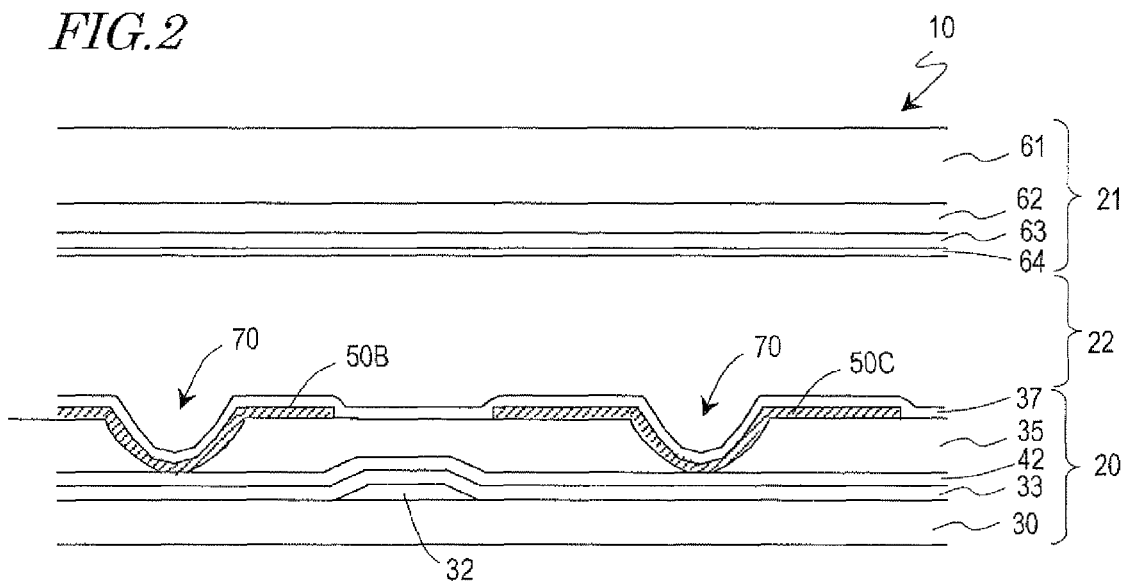
FIG. 2 Schematic cross-sectional view taken along line A-A' of FIG. 1.

FIG. 1 is a plan view of a liquid crystal display device 10 of the present embodiment, schematically showing the structure of one of a plurality of pixels 12 in a matrix arrangement. FIG. 2 is a schematic cross-sectional view of the liquid crystal display device 10 taken along line A-A' of FIG. 1.

Note that, in this specification, the minimum unit of display and a region corresponding thereto are referred to as "pixel". For example, in liquid crystal display device which perform display based on three colors, R (red), G (green), and B (blue), three pixels of R, G, and B are supposed to constitute one pixel unit. A pixel is defined as a region enclosed by two adjacent gate bus lines (scanning lines) and adjacent two of source bus lines (signal lines) extending in a direction perpendicular to the longitudinal direction of the gate bus lines.

As shown in FIG. 2, the liquid crystal display device 10 includes a TFT substrate (first substrate) 20 which is an active matrix substrate, a counter substrate (second substrate) 21 which is a color filter substrate, and a liquid crystal layer 22 interposed between these substrates. The liquid crystal layer 22 includes nematic liquid crystal which has negative dielectric constant anisotropy ($\Delta\epsilon < 0$).

In the TFT substrate 20, on a glass substrate (transparent substrate) 30, as shown in FIG. 1, gate bus lines (scanning lines) 31 are provided so as to extend in parallel to each other, and auxiliary capacitance lines (Cs lines) 32 are provided between the adjacent gate bus lines 31 so as to extend in parallel to the gate bus lines 31. Note that FIG. 1 shows only part of the gate bus lines 31 and the auxiliary capacitance lines 32 (part near the pixel 12), but these lines actually extend in horizontal directions in the drawing without being cut off at the edges of the pixel. The gate bus lines 31 and the auxiliary capacitance lines 32 are made of a metal, such as Ta (tantalum) or the like, and have a thickness of, for example, 300 nm.

A gate insulating layer 33 is provided on the gate bus lines 31 and the auxiliary capacitance lines 32 so as to cover these lines. Source bus lines (signal lines) 34 are provided on the gate insulating layer 33 so as to extend parallel to each other and perpendicular to the gate bus lines 31. The gate insulating layer 33 is formed of, for example, silicon nitride ($SiN_x$) and has a thickness of, for example, 350 nm.

Each pixel 12 includes a TFT (Thin Film Transistor) as shown in FIG. 1. The TFT 40 is formed by a gate electrode 40G connected to the gate bus line, an unshown semiconductor layer, a source electrode 40S branching off from the source bus line 34, and a drain electrode 40D.

A line which branches off from the drain electrode 40D and which is an integral part of the drain electrode 40D extends under a plurality of subpixel electrodes which will be described later. This line is herein referred to as a drain line (or connecting portion) 42. The drain line 42 is configured to have wider width portions on the auxiliary capacitance lines 32. These wider width portions and the auxiliary capacitance lines 32 constitute auxiliary capacitance. For example, the source bus lines 34, the source electrode 40S, the drain electrode 40D, and the drain line 42 are formed of ITO or have a two-layer structure of ITO and Ta, and have a thickness of about 400 nm.

An insulating layer 35 made of an acrylic resin, or the like, is provided so as to cover the TFTs 40, the source bus lines 34, the drain lines 42, etc. On the insulating layer 35, pixel electrodes 50 of, for example, ITO are provided in the respective pixels 12. The thickness of the insulating layer 35 is, for example, 1 µm. The thickness of the pixel electrodes 50 is, for example, 140 nm.

The pixel electrode 50 is formed by three subpixel electrodes 50A, 50B, and 50C (also "50A-50C") which are electrically separated from one another on the insulating layer 35. Note that the pixel electrode 50 does not necessarily include three subpixel electrodes but may be formed by two or four or more subpixel electrodes. In this embodiment, when seen in a direction perpendicular to the surface of the TFT substrate 20, the shape of the subpixel electrodes 50A-50C is quadrate. However, the subpixel electrodes 50A-50C are not limited to such a shape and may have any other shape, such as a generally quadrate shape with rounded corners, a circular shape, etc. The length of a side of the subpixel electrodes 50A-50C is, for example, about 100 µm.

Provided over the pixel electrode 50 (over surface of the pixel electrode 50 closer to the liquid crystal layer) is an alignment film 37 made of a polyimide resin, or the like, and configured to align the liquid crystal molecules vertically to the substrate surface in the absence of an applied voltage. The thickness of the alignment film 37 is, for example, 700 nm.

Each of the subpixel electrodes 50A-50C has, at its center, a recess 70 recessed toward the insulating layer 35. At the bottom of the recess 70, the subpixel electrodes 50A-50C and the drain line 42 are electrically connected. Specifically, the insulating layer 35 has, at the positions of the recesses 70, hollows (holes) opened in the upper surface to reach the drain line 42. The subpixel electrodes 50A-50C are provided on the hollows such that the subpixel electrodes 50A-50C and the drain line 42 are electrically connected. When seen in a direction perpendicular to the substrate surface, the recess 70 has a generally circular shape. The recess 70 desirably has a diameter which is not less than 5 μm and not more than 25 μm and a depth which is not less than 1 μm and not more than 5 μm.

In the liquid crystal display device of this embodiment, the subpixel electrodes 50A-50C each include division domains of the liquid crystal molecules. In each domain, the slope surface of the recess 70 serves to control the alignment of the liquid crystal molecules such that the liquid crystal molecules are radially oriented from the domain center under an applied voltage. A surface of the TFT substrate 20 closer to the liquid crystal layer 22 is not provided with a bridge portion of the pixel electrode and is free of liquid crystal alignment disturbance which would be caused by the presence of the bridge portion.

The counter substrate 21 includes, as shown in FIG. 2, a glass substrate (insulator substrate) 61, a color filter layer 62, a common electrode 63, and an alignment film 64 disposed on a surface of the common electrode 63 closer to the liquid crystal layer 22. The color filter layer 62 includes a plurality of color filters of, for example, RGB, and a black matrix configured in a matrix arrangement so as to enclose the respective color filters. The common electrode 63 is a transparent electrode of ITO. The alignment film 64 is made of a polyimide resin, or the like.

The common electrode 63 does not have slits or hollows. Also, the common electrode 63 does not have protrusions such as bumps. Therefore, part of both the common electrode 63 and the alignment film 64 lying above the whole area of the pixels 12, including part lying above the pixel electrodes 50, is substantially flat. In other words, part of the interface between the liquid crystal layer 22 and the counter substrate 21 lying above the whole area of the pixels 12 is substantially flat.

Next, the alignment control of the liquid crystal molecules in the liquid crystal display device 10 is described.

When the TFT 40 is turned on according to a signal from the gate bus line 31, another signal from the source bus lines 34 is supplied to the respective subpixel electrodes 50A-50C via the drain line 42, and a predetermined charge is written in the subpixel electrodes 50A-50C. As a result, a difference in potential is caused between the subpixel electrodes 50A-50C and the common electrode 63. The orientation of the liquid crystal molecules changes according to a voltage applied across the liquid crystal layer 22. The orientation of the liquid crystal molecules is controlled separately in respective pixels such that the light transmittance of the liquid crystal layer 22 is adjusted in the respective pixels for displaying images.

Figure 3:
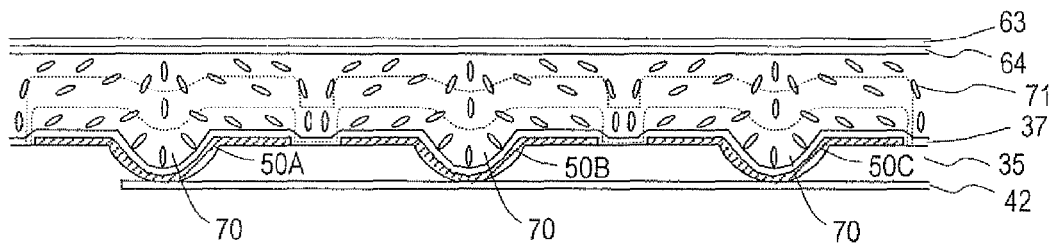
FIG. 3 Illustration of a state of alignment of liquid crystal molecules 71 in the liquid crystal display device 10.
Figure 4:
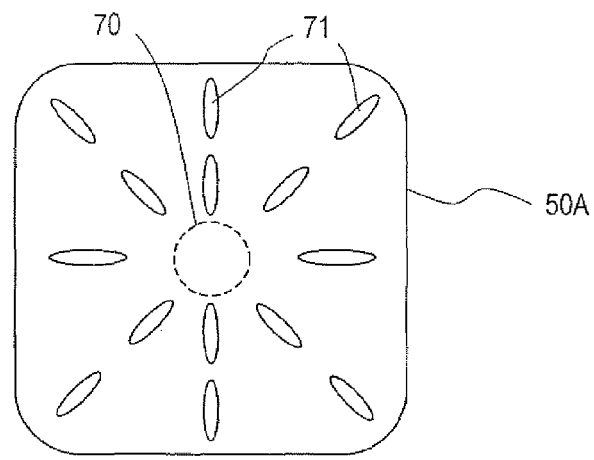
FIG. 4 Diagram for illustrating the alignment of the liquid crystal molecules 71 over a subpixel electrode 50A.
Figure 5:
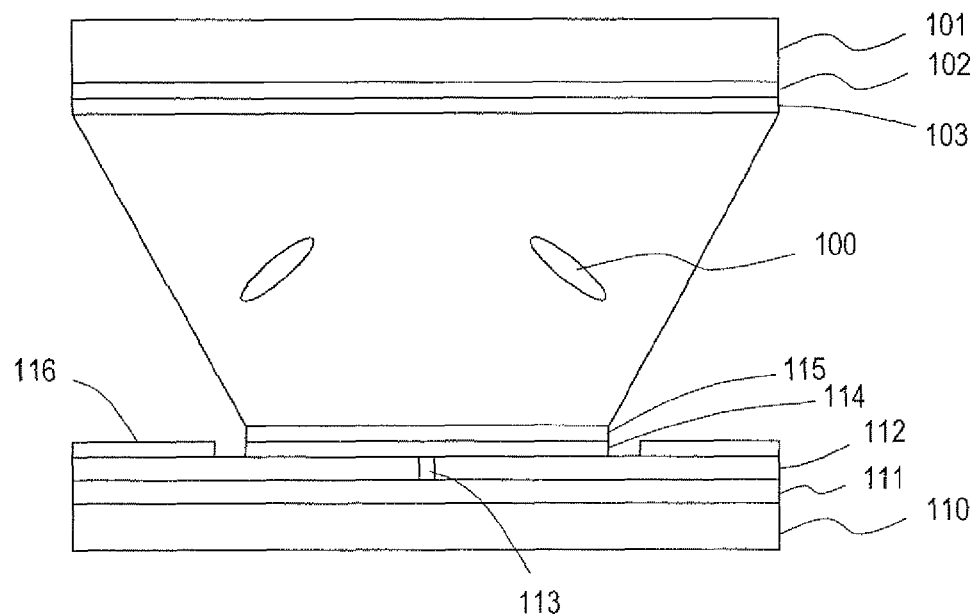
FIG. 5 Illustration of the structure of a pixel portion of a conventional vertical alignment type liquid crystal display device.
Figure 6:
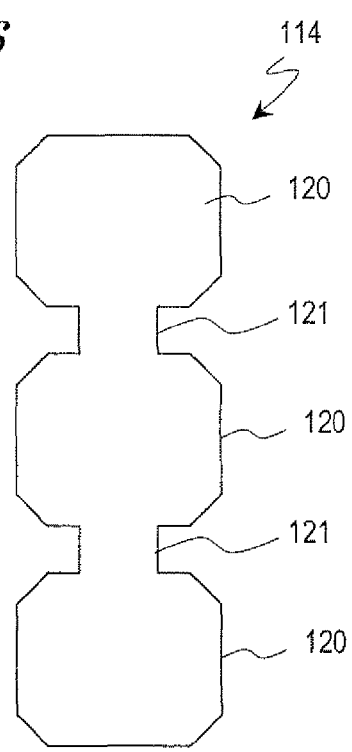
FIG. 6 Illustration of an example of the shape of a pixel electrode in the conventional liquid crystal display device.
Figure 7:
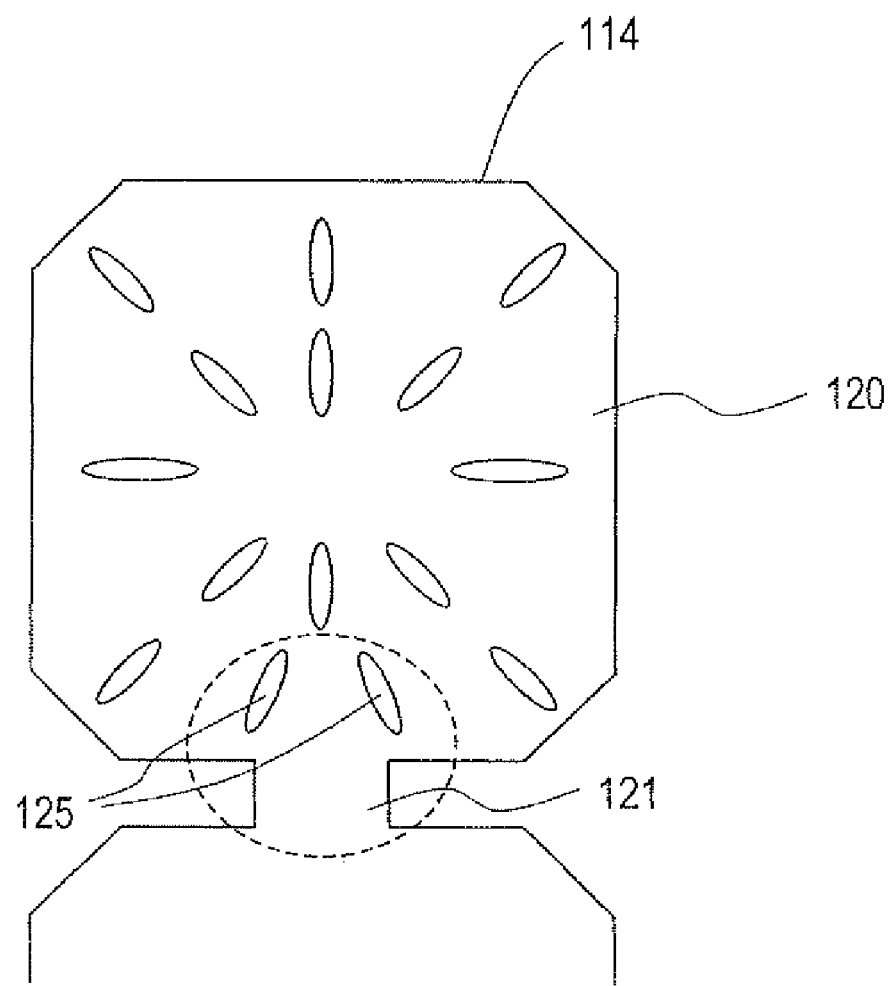
FIG. 7 Illustration of disturbance in the liquid crystal alignment which is caused by a conventional pixel electrode.

FIGS. 3 and 4 illustrate the alignment of the liquid crystal molecules 71 over the pixel electrodes 50.

In the absence of an applied voltage across the liquid crystal layer 22 (in black display), the liquid crystal molecules 71 are aligned vertically to the substrate surfaces according to the alignment control by the alignment film 37 and the alignment film 64. Therefore, part of the liquid crystal molecules 71 residing above the pixel electrode excluding the recesses 70 are aligned substantially vertically to the substrate surfaces of the TFT substrate 20 and the counter substrate 21, whereas the other part of the liquid crystal molecules 71 residing above the recesses 70 are aligned vertically to the side surfaces of the recesses 70, i.e., in directions not perpendicular to the substrate surfaces. When seen in a direction perpendicular to the substrate surfaces, the liquid crystal molecules 71 residing above the recesses 70 are in a radially-sloped alignment around the centers of the recesses 70.

When a voltage is applied across the liquid crystal layer 22, an equipotential surface is generated in the liquid crystal layer 22 as represented by a phantom circle in FIG. 3, and the liquid crystal molecules 71 change their orientations so as to be parallel to the equipotential surface because of their negative dielectric constant anisotropy. Under these conditions, when seen in a direction perpendicular to the substrate surfaces, the equipotential surface is substantially uniform, excluding a region near the recesses 70 of the subpixel electrodes 50A-50C, so that the slope directions of the liquid crystal molecules 71 can be all the azimuthal directions of 360°. However, under an applied voltage, the liquid crystal molecules 71 near the recesses 70 are oriented radially from the centers of the recesses 70 (i.e., the centers of the respective subpixel electrodes 50A-50C) because the liquid crystal molecules 71 residing above the slope surfaces of the recesses 70 are already oriented in directions perpendicular to the slope surfaces in the absence of an applied voltage and because the equipotential surfaces produced above the recesses 70 under an applied voltage are parallel to the slope surfaces of the recesses 70. Meanwhile, the other liquid crystal molecules than those near the recesses 70 are affected by the orientations of the liquid crystal molecules near the recesses 70 to be oriented radially from the centers of the subpixel electrodes 50A-50C.

Thus, under an applied voltage, the liquid crystal molecules 71 residing above the subpixel electrodes 50A-50C are oriented radially from the center of each of the subpixel electrodes 50A-50C as shown in FIG. 4. In this way, since the recesses 70 serve as the alignment control means, the liquid crystal molecules in the pixels 12 change their orientations in a short period of time after application of the voltage, uniformly in the azimuthal directions, in each of the subpixel electrodes 50A-50C. Also, there is a small probability of occurrence of alignment disturbance because the subpixel electrodes 50A-50C have separate configurations without a bridge portion. Thus, the display is realized with uniform viewing angle characteristics in all the azimuthal directions and high response rate.

In the conventional liquid crystal display devices where a plurality of subpixel electrodes which constitute a pixel electrode are connected together by bridge portions, disturbance occurs in the alignment of liquid crystal molecules near the boundaries between the subpixel electrodes and the bridge portions. As a result, display unevenness occurs, and the viewing angle characteristics become nonuniform, so that the display quality is degraded. In the liquid crystal display device 10 of the present embodiment where the subpixel electrodes 50A-50C are not connected together on the substrate surface, occurrence of display unevenness and degradation of the viewing angle characteristics are prevented. Therefore, images of high display quality can be provided.

In the present embodiment, the common electrode 63 and the alignment film 64 do not have hollows, slits, protrusions, or the like, and the interface between the counter substrate 21 and the liquid crystal layer 22 is flat. Therefore, the fabrication efficiency of the counter substrate 21 improves, and the probability of alignment disturbance caused by the counter substrate 21 decreases.

In the present embodiment, the alignment control means is provided on the TFT substrate 20 side. Therefore, registration of the TFT substrate 20 and the counter substrate 21 is easy when they are assembled together. Should the alignment control means be provided on the counter substrate 21 side, it would be necessary to carry out registration of pixel electrodes and the alignment control means with extreme precision in the step of assembling together the TFT substrate 20 and the counter substrate 21. Should misregistration occur between them, the center of alignment would deviate from the center of the subpixel electrode, so that uneven display and degradation of the viewing angle characteristics would occur. In the liquid crystal display device 10 of the present embodiment, the alignment divisions and the position of the alignment center are determined depending on the shape of the pixel electrodes 50 on the TFT substrate 20. Therefore, assemblage of the TFT substrate 20 and the counter substrate 21 becomes easier, and more precise alignment control is possible.

In the liquid crystal display device of the present embodiment, the drain line 42 branching off from the drain electrode 40D and the subpixel electrodes 50A-50C are connected together at the bottoms of the recesses which serve as the alignment control means. Therefore, it is not necessary to provide an additional contact hole for supply of a voltage to the subpixel electrodes 50A-50C. Since the liquid crystal alignment is controlled according to the shape of the subpixel electrodes 50A-50C, the device fabrication process does not need to include a rubbing process for defining the azimuthal directions of the liquid crystal alignment. Thus, in the present embodiment, the fabrication efficiency is further improved, and the liquid crystal display device can be provided at a lower cost.

INDUSTRIAL APPLICABILITY

The present invention enables provision of a high image quality liquid crystal display device with a high response rate and with excellent contrast and viewing angle characteristics, with high fabrication efficiency. The liquid crystal display device of the present invention is preferable for use in a variety of liquid crystal display devices, for example, mobile phones, on-vehicle display devices such as navigation systems, display devices for ATMs and vending machines, portable display devices, liquid crystal display devices for notebook PCs, etc.

The invention claimed is:

1. A liquid crystal display device including a plurality of pixels, comprising:
   a first substrate which includes an insulating layer, pixel electrodes disposed on the insulating layer respectively in the plurality of pixels, and an alignment film disposed on the pixel electrodes for vertically aligning liquid crystal molecules in the absence of an applied voltage;
   a second substrate which has a common electrode; and
   a liquid crystal layer interposed between the first substrate and the second substrate,
   wherein each of the pixel electrodes includes a plurality of subpixel electrodes electrically separated from one another on the insulating layer,
   each of the plurality of subpixel electrodes has a recess recessed toward the insulating layer,
   the first substrate includes a connecting portion which is provided under the insulating layer and which is electrically connected to respective one of the plurality of subpixel electrodes at the recess, and
   part of the common electrode lying above a whole area of the pixel electrodes is substantially flat.

2. The liquid crystal display device of claim 1, wherein part of an interface between the liquid crystal layer and the second substrate lying above the whole area of the pixel electrodes is substantially flat.

3. The liquid crystal display device of claim 1, wherein the second substrate includes a second alignment film which is disposed on a surface of the common electrode closer to the liquid crystal layer and which is configured to vertically align the liquid crystal molecules in the absence of an applied voltage, and
part of the second alignment film lying above a whole area of respective one of the plurality of subpixel electrodes is substantially flat.

4. The liquid crystal display device of claim 1, further comprising TFTs respectively provided in the plurality of pixels, wherein
each of the plurality of pixel electrodes and each of drain electrodes of the TFTs are electrically coupled via the connecting portion.

5. The liquid crystal display device of claim 1, wherein the recess is provided at a center of each of the plurality of subpixel electrodes.

6. The liquid crystal display device of claim 1, wherein the recess has a generally-circular shape when seen in a direction perpendicular to a surface of the first substrate.

7. The liquid crystal display device of claim 6, wherein a diameter of the recess is not less than 5 µm and not more than 25 µm when seen in a direction perpendicular to the surface of the first substrate.

8. The liquid crystal display device of claim 1, wherein a depth of the recess is not less than 1 µm and not more than 5 µm.

* * * * *